United States Patent
Chen

(10) Patent No.: US 7,454,651 B2
(45) Date of Patent: Nov. 18, 2008

(54) MAIN-BOARD WITHOUT RESTRICTION ON MEMORY FREQUENCY AND CONTROL METHOD THEREOF

(75) Inventor: Yueh-Chih Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 491 days.

(21) Appl. No.: 11/126,247

(22) Filed: May 11, 2005

(65) Prior Publication Data
US 2005/0268139 A1      Dec. 1, 2005

(30) Foreign Application Priority Data
May 28, 2004    (TW) .............. 93115402 A

(51) Int. Cl.
*G06F 1/04*      (2006.01)
(52) U.S. Cl. ...................... 713/600; 713/500
(58) Field of Classification Search .......... 713/500, 713/600
See application file for complete search history.

(56) References Cited

U.S. PATENT DOCUMENTS

| | | | | |
|---|---|---|---|---|
| 5,459,855 A | * | 10/1995 | Lelm | 713/400 |
| 5,935,255 A | * | 8/1999 | So et al. | 713/400 |
| 6,457,137 B1 | * | 9/2002 | Mitchell et al. | 713/400 |
| 6,496,888 B1 | * | 12/2002 | Pole, II | 710/110 |
| 6,763,478 B1 | * | 7/2004 | Bui | 713/600 |
| 7,007,187 B1 | * | 2/2006 | Wilcox et al. | 713/500 |
| 7,096,377 B2 | * | 8/2006 | Kumar et al. | 713/600 |
| 2003/0204762 A1 | * | 10/2003 | Lee et al. | 713/322 |

* cited by examiner

*Primary Examiner*—Chun Cao
(74) *Attorney, Agent, or Firm*—Birch, Stewart, Kolasch & Birch, LLP

(57) ABSTRACT

A main-board comprises a CPU, a chipset and a clock-rate control-signal generating module. The chipset has at least a phase-locked circuit, a CPU-bus circuit and a memory-bus circuit. The phase-locked circuit is electrically connected to the CPU-bus circuit and the memory-bus circuit. The CPU-bus circuit is electrically connected to the CPU. The clock-rate control-signal generating module generates a clock-rate control signal and is electrically connected to the CPU and the chipset. The clock-rate control signal is transmitted to the phase-locked circuit of the chipset. The phase-locked circuit resets the ratio of the information-transmitting frequency of the CPU-bus circuit to the information-transmitting frequency of the memory-bus circuit in accordance with the clock-rate control signal.

13 Claims, 3 Drawing Sheets

MAIN-BOARD WITHOUT RESTRICTION ON MEMORY FREQUENCY AND CONTROL METHOD THEREOF

BACKGROUND OF THE INVENTION

1. Field of Invention

The invention relates to a main-board and a control method thereof and, in particular, to a main-board and a control method thereof capable of enabling a memory module to achieve a higher and more efficient information-transmitting frequency without being restricted by a fixed transmission frequency ratio of a chipset.

2. Related Art

With the progress of the computer technology, the memory with a higher clock also has been successfully developed. The memory that is mostly widely used in the market is the DDR (Double Data Rate) memory, which is the mainstream standard of the PC memory in the past few years. The current DDR specification has reached 400 MHz, but another memory with the DDR2 specification is ready to replace the current DDR memory. The DDR2 specification starts from 533 MHz and is developed toward 667 MHz. The higher clock can achieve the higher data transmission efficiency and enhance the computer efficiency. Meanwhile, the DDR2 memory is more power-saving. According to the statistical result of Samsung Company, the power consumption of the DDR2 memory of 533 MHz clock is smaller than 65% that of the DDR memory of 400 MHz. This also can save the power consumption of the notebook computer. However, the available chipsets on the main-boards have been set some preset specification ratio. Regarding to the CPU (Central Processing Unit) having a specification of FSB-800, for example, the corresponding memory should be a maximum specification of DDR2-533 according to the preset specification ratio set in the chipset.

Referring to FIG. 1, a conventional main-board includes a CPU 11, a chipset 12, a memory module 13 and a clock-generating module 14. The clock-generating module 14 generates a clock signal $CK_0$, which is inputted to the CPU 11 and the chipset 12. The CPU 11 provides ratio information to the chipset 12, wherein the ratio information $I_0$ is a specification ratio that is originally set in the chipset 12. For example, if the specification ratio is 2:3, the corresponding CPU 11 and memory module 13 may respectively have the specifications of FSB-533 (CPU-bus 133 MHz) and DDR2-400 (Memory-bus 200 MHz). Furthermore, if the specification ratio is 5:6, the corresponding CPU 11 and memory module 13 may respectively have the specifications of FSB-667 (CPU-bus 166 MHz) and DDR2-400 (Memory-bus 200 MHz).

As mentioned above, because the chipset always has some preset and fixed specification ratios, the efficiency of the memory module with a higher clock is restricted, and the data transmission efficiency set in the memory module itself cannot be achieved. Therefore, it is an important subjective to provide a main-board capable of making the memory module achieve the information-transmitting frequency with higher efficiency without being restricted by the fixed specification ratio that is set in the chipset.

SUMMARY OF THE INVENTION

In view of the foregoing, the invention is to provide a main-board capable of enabling a memory module to have a more efficient information-transmitting frequency without being restricted by a fixed specification ratio of a chipset.

To achieve the above, a main-board of the invention includes a CPU, a chipset and a clock-rate control-signal generating module. The chipset has a phase-locked circuit, a CPU-bus circuit and a memory-bus circuit. The phase-locked circuit is electrically connected to the CPU-bus circuit and the memory-bus circuit, and the CPU-bus circuit is electrically connected to the CPU. The clock-rate control-signal generating module is electrically connected to the CPU and the chipset, and generates a clock-rate control signal to be transmitted to the phase-locked circuit of the chipset. The phase-locked circuit resets a transmission frequency ratio of an information-transmitting frequency of the CPU-bus circuit to an information-transmitting frequency of the memory-bus circuit according to the clock-rate control signal.

In addition, the invention also discloses a control method of a main-board, which includes a CPU and a chipset having a phase-locked circuit, a CPU-bus circuit and a memory-bus circuit. The control method includes a first control step, a clock-rate information detecting step and a second control step. The first control step enables the CPU to transmit original ratio information to a clock-rate control-signal generating module, which generates a clock-rate control signal to be transmitted to the phase-locked circuit. The phase-locked circuit sets a transmission frequency ratio of an information-transmitting frequency of the CPU-bus circuit to an information-transmitting frequency of the memory-bus circuit according to the clock-rate control signal. The clock-rate information detecting step is to detect a specification of a memory module so as to generate a clock-rate information to be transmitted to the clock-rate control-signal generating module. The second control step enables the clock-rate control-signal generating module to generate another clock-rate control signal to be transmitted to the phase-locked circuit according to the clock-rate information. The phase-locked circuit resets the transmission frequency ratio of the information-transmitting frequency of the CPU-bus circuit to the information-transmitting frequency of the memory-bus circuit according to the another clock-rate control signal.

As mentioned above, the main-board of the invention changes the transmission frequency ratio of the information-transmitting frequency of the CPU-bus circuit to the information-transmitting frequency of the memory-bus circuit according to the clock-rate control-signal generating module. Thus, the memory module can achieve a higher and more efficient information-transmitting frequency without being restricted by the fixed specification ratio of the chipset.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
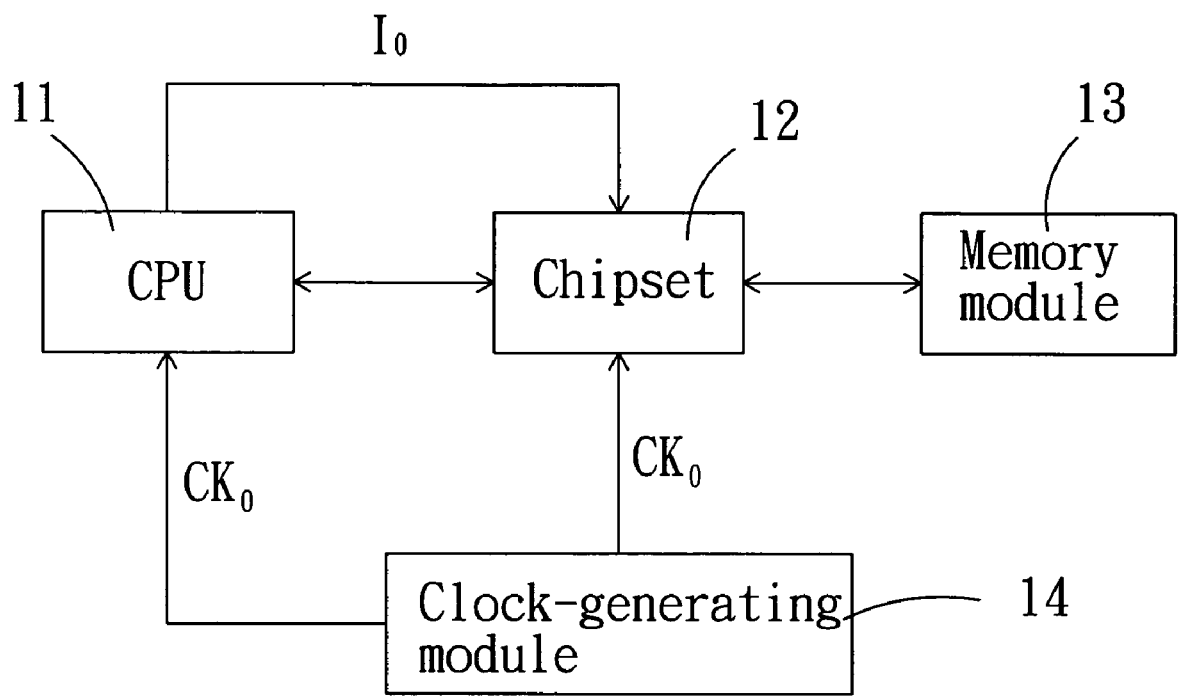
FIG. 1 is a schematic diagram showing a partially circuit block of the conventional main-board.
Figure 2:
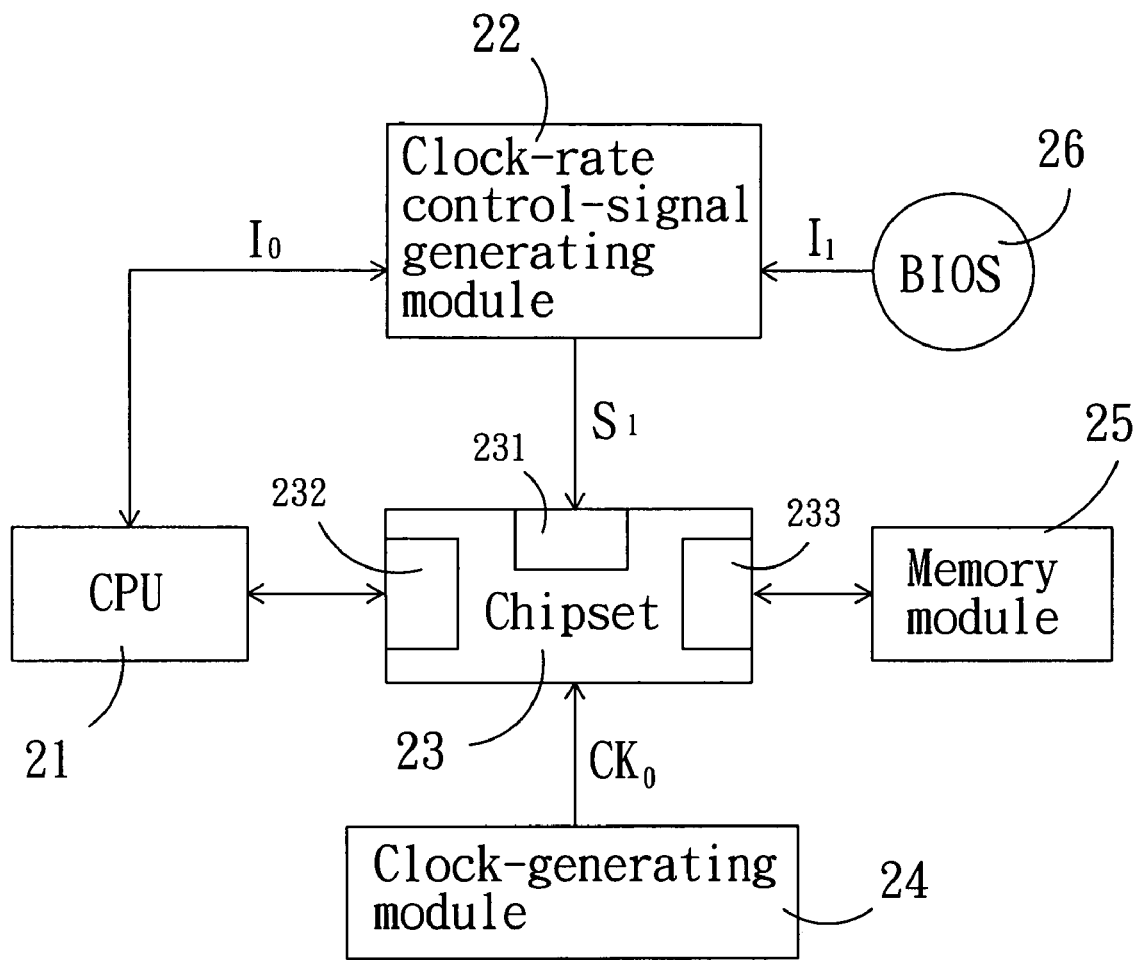
FIG. 2 is a schematic diagram showing a partially circuit block of a main-board according to a preferred embodiment of the invention.

Referring to FIG. 2, a main-board according to a preferred embodiment of the invention includes a CPU (Central Processing Unit) 21, a clock-rate control-signal generating module 22, a chipset 23, a clock-generating module 24, at least one memory module 25 and a BIOS (Basic Input/Output System) module 26. In this embodiment, the chipset 23 is a north bridge chipset, which includes a phase-locked circuit 231, a CPU-bus circuit 232, and a memory-bus circuit 233. The phase-locked circuit 231 is electrically connected to the CPU-bus circuit 232 and the memory-bus circuit 233, and the CPU-bus circuit 232 is electrically connected to the CPU 21.

The clock-rate control-signal generating module 22, which is electrically connected to the CPU 21 and the chipset 23, generates a clock-rate control signal $S_1$, which is transmitted to the phase-locked circuit 231 of the chipset 23. The phase-locked circuit 231 resets a transmission frequency ratio of the information-transmitting frequency of the CPU-bus circuit 232 to the information-transmitting frequency of the memory-bus circuit 233 according to the clock-rate control signal $S_1$.

The clock-generating module 24 is electrically connected to the chipset 23 and generates a clock signal $CK_0$ to be transmitted to the chipset 23. In this embodiment, the frequency of the clock signal $CK_0$ is substantially equal to the information-transmitting frequency of the CPU-bus circuit 232. In addition, the information-transmitting frequency of the memory-bus circuit 233 in this embodiment is equal to the product of the frequency of the clock signal $CK_0$ and the transmission frequency ratio of the information-transmitting frequency of the CPU-bus circuit 232 to the information-transmitting frequency of the memory-bus circuit 233.

The memory module 25 is electrically connected to the memory-bus circuit 233 of the chipset 23.

The BIOS module 26 is electrically connected to the clock-rate control-signal generating module 22. The BIOS module 26 outputs clock-rate information $I_1$ to the clock-rate control-signal generating module 22, which generates a clock-rate control signal $S_1$ according to the clock-rate information $I_1$. In the present embodiment, the clock-rate control-signal generating module 22 further includes a ratio look-up table and at least one register. When the BIOS module 26 outputs a clock-rate information $I_1$ to the clock-rate control-signal generating module 22, the clock-rate control signal $S_1$ corresponding to the clock-rate information $I_1$ is selected from the ratio look-up table and stored in the register.

In order to make the invention more comprehensive, an example will be described to illustrate the flow of the control method of the main-board according to the preferred embodiment of the invention.

Figure 3:
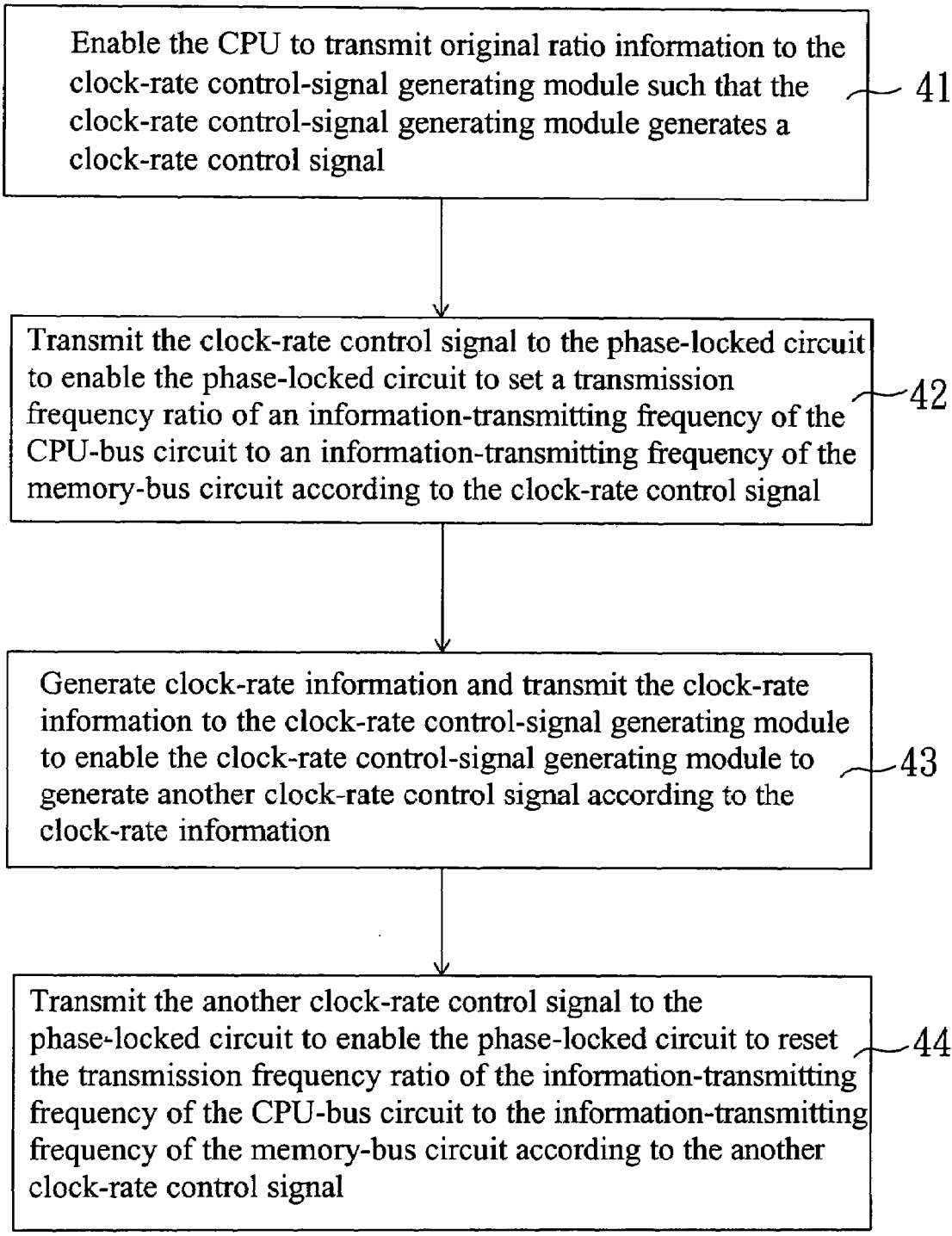
FIG. 3 is a flow chart showing a control method of a main-board according to the preferred embodiment of the invention.

Referring to FIGS. 3 and 2, the control method of the main-board, which includes a CPU (Central Processing Unit) 21, a clock-rate control-signal generating module 22, a chipset 23 including a phase-locked circuit 231, a CPU-bus circuit 232, and a memory-bus circuit 233, according to the preferred embodiment of the invention includes the following steps 41 to 44. In the present embodiment, the clock-generating module 24 generates a clock signal $CK_0$, which is a signal of 166 MHz and is then transmitted to the chipset 23.

First, in the step 41, the CPU 21 transmits an original ratio information $I_0$ to a clock-rate control-signal generating module 22, which generates a clock-rate control signal $S_1$ accordingly. In the embodiment, the original ratio information $I_0$ is a signal with a ratio of 5:6.

Then, in the step 42, the clock-rate control signal $S_1$ is transmitted to the phase-locked circuit 231, which sets the transmission frequency ratio of the information-transmitting frequency of the CPU-bus circuit 232 to the information-transmitting frequency of the memory-bus circuit 233 according to clock-rate control signal $S_1$. In this embodiment, the transmission frequency ratio of the information-transmitting frequency of the CPU-bus circuit 232 to the information-transmitting frequency of the memory-bus circuit 233 is 5:6. In this case, the CPU 21 receives the signal of 166 MHz, and the memory module 25 correspondingly receives the signal of 200 MHz according to the ratio. In this embodiment, the memory module 25 is a memory module of the DDR2 specification and receives the signal of 200 MHz, so the memory module 25 has the DDR2-400 specification.

Next, in the step 43, a clock-rate information $I_1$ is generated. In this embodiment, the clock-rate information $I_1$ is the 2:3 information, which is transmitted to the clock-rate control-signal generating module 22 from the BIOS module 26. Accordingly, the clock-rate control-signal generating module 22 generates another clock-rate control signal $S_1$ according to the clock-rate information $I_1$.

Finally, in the step 44, the another clock-rate control signal $S_1$ is transmitted to the phase-locked circuit 231, which resets the transmission frequency ratio of the information-transmitting frequency of the CPU-bus circuit 232 to the information-transmitting frequency of the memory-bus circuit 233 according to the another clock-rate control signal $S_1$. In this embodiment, the transmission frequency ratio of the information-transmitting frequency of the CPU-bus circuit 232 to the information-transmitting frequency of the memory-bus circuit 233 is 2:3. In such a case, the CPU 21 still receives the signal of 166 MHz, and the memory module 25 correspondingly receives the signal of 250 MHz according to the ratio. Because the memory module 25 is the memory module of the DDR2 specification and receives the signal of 250 MHz, the memory module 25 may have the DDR2-500 specification. Thus, when the CPU 21 works at the standard frequency, the memory can have the working specification over DDR2-400.

In summary, the main-board of the invention changes the transmission frequency ratio of the information-transmitting frequency of the CPU-bus circuit to the information-transmitting frequency of the memory-bus circuit according to the clock-rate control-signal generating module. Therefore, the memory module can achieve a higher and more efficient information-transmitting frequency without being restricted by the fixed specification ratio of the chipset.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A main-board, comprising:
    a CPU (Central Processing Unit);
    a chipset having a phase-locked circuit, a CPU-bus circuit and a memory-bus circuit, wherein the phase-locked circuit is electrically connected to the CPU-bus circuit and the memory-bus circuit, and the CPU-bus circuit is electrically connected to the CPU, wherein a transmission frequency ratio of an information-transmitting frequency of the CPU-bus circuit to an information-transmitting frequency of the memory-bus circuit is initially set by the CPU; and
    a clock-rate control-signal generating module electrically connected to the CPU and the chipset and generating a clock-rate control signal to be transmitted to the phase-locked circuit of the chipset, wherein the phase-locked circuit resets the transmission frequency ratio of an information-transmitting frequency of the CPU-bus circuit to an information-transmitting frequency of the memory-bus circuit according to the clock-rate control signal.

2. The main-board according to claim 1, further comprising:
a clock-generating module electrically connected to the CPU and the chipset and generating a clock signal to be transmitted to the CPU and the chipset.

3. The main-board according to claim 2, wherein a frequency of the clock signal is equal to the information-transmitting frequency of the CPU-bus circuit.

4. The main-board according to claim 2, wherein the information-transmitting frequency of the memory-bus circuit is equal to the product of the transmission frequency ratio and a frequency of the clock signal.

5. The main-board according to claim 1, further comprising:
at least one memory module electrically connected to the memory-bus circuit of the chipset.

6. The main-board according to claim 5, wherein the memory module is a memory module with DDR2 specification.

7. The main-board according to claim 1, further comprising:
a BIOS (Basic Input/Output System) module electrically connected to the clock-rate control-signal generating module and outputting clock-rate information to the clock-rate control-signal generating module, wherein the clock-rate control-signal generating module generates the clock-rate control signal according to the clock-rate information.

8. The main-board according to claim 7, wherein the BIOS module further outputs clock-changing information to the clock-rate control-signal generating module, the clock-rate control-signal generating module generates a clock control signal according to the clock-changing information, the clock control signal is transmitted to the clock-generating module through the CPU, and the clock-generating module generates another clock signal according to the clock control signal.

9. The main-board according to claim 1, wherein the chipset is a north bridge chipset.

10. A control method of a main-board, wherein the main-board comprises a CPU (Central Processing Unit), a clock-rate control-signal generating module and a chipset, and the chipset has a phase-locked circuit, a CPU-bus circuit and a memory-bus circuit, the method comprising:
transmitting original ratio information from the CPU to the clock-rate control-signal generating module such that the clock-rate control-signal generating module generates a clock-rate control signal;
transmitting the clock-rate control signal to the phase-locked circuit to enable the phase-locked circuit to set a transmission frequency ratio of an information-transmitting frequency of the CPU-bus circuit to an information-transmitting frequency of the memory-bus circuit according to the clock-rate control signal;
generating clock-rate information and transmitting the clock-rate information to the clock-rate control-signal generating module to enable the clock-rate control-signal generating module to generate another clock-rate control signal according to the clock-rate information; and
transmitting the another clock-rate control signal to the phase-locked circuit to enable the phase-locked circuit to reset the transmission frequency ratio of the information-transmitting frequency of the CPU-bus circuit to the information-transmitting frequency of the memory-bus circuit according to the another clock-rate control signal.

11. The control method according to claim 10, wherein the main-board further comprises a BIOS (Basic Input/Output System) module, and the clock-rate information is inputted form the BIOS module to the clock-rate control-signal generating module.

12. The control method according to claim 10, wherein the information-transmitting frequency of the CPU-bus circuit is maintained originally.

13. The main-board according to claim 1, wherein the information-transmitting frequency of the CPU-bus circuit is maintained originally.

* * * * *